March 17, 1925.
P. L. BILLINGSLEY
PLANER
Filed July 5, 1921
1,530,028
2 Sheets-Sheet 1
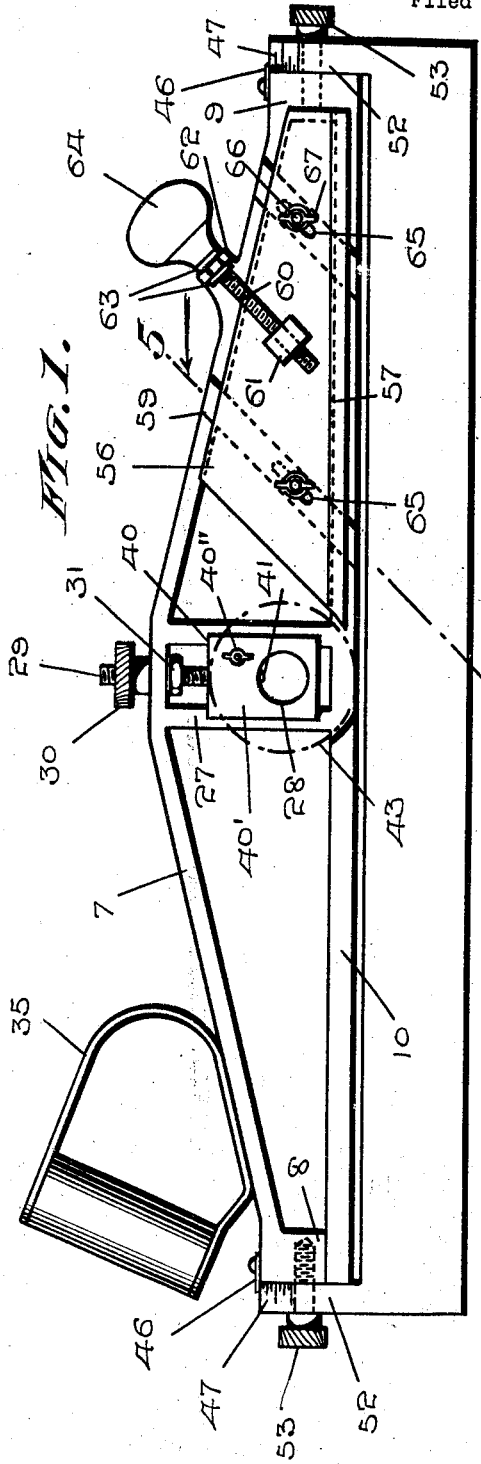
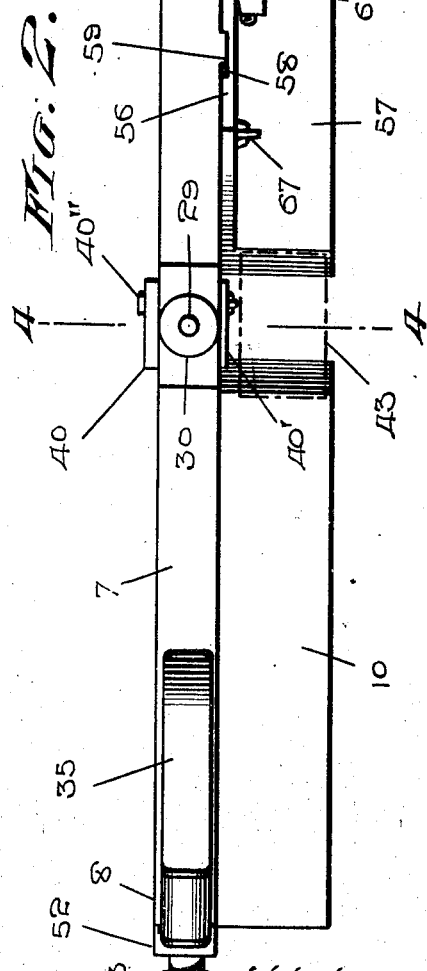
INVENTOR
P. L. BILLINGSLEY
by W. J. FitzGerald & Co.
ATTORNEYS March 17, 1925.
P. L. BILLINGSLEY
PLANER
Filed July 5, 1921
1,530,028
2 Sheets-Sheet 2
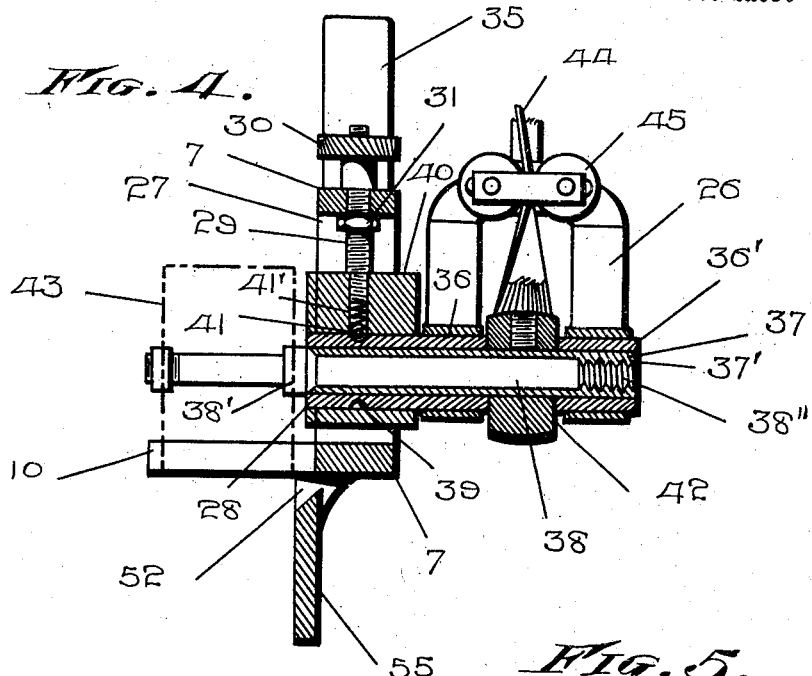
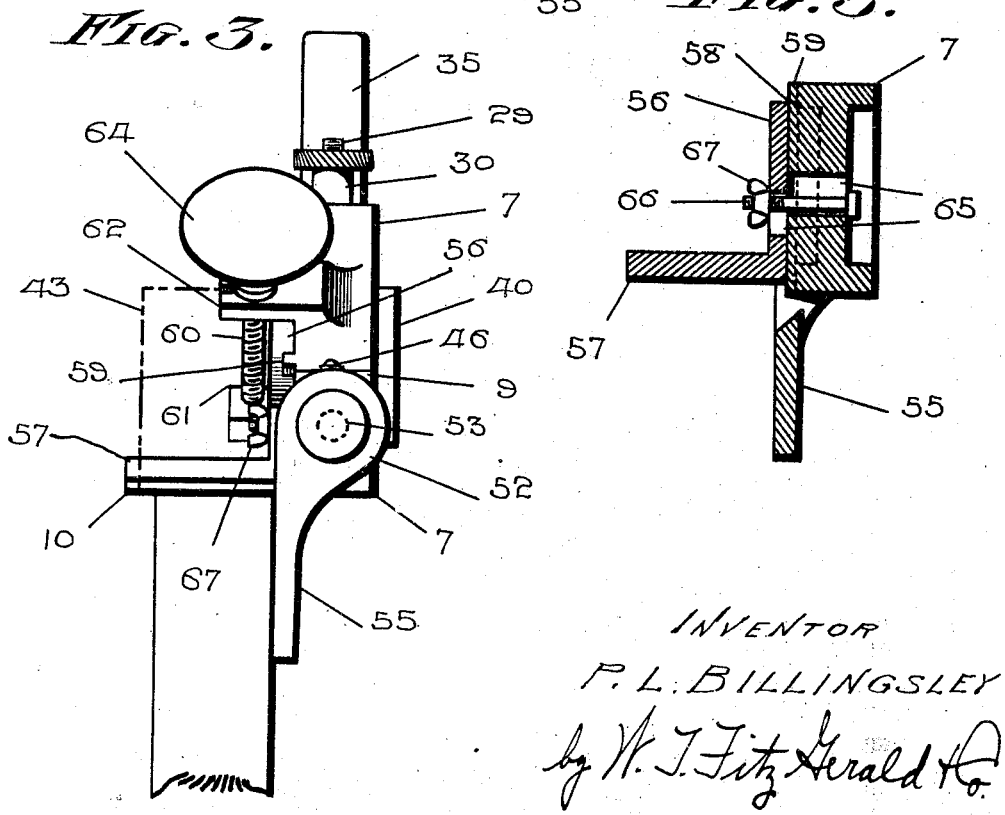
INVENTOR
P. L. BILLINGSLEY
by W. J. Fitz Gerald
ATTORNEYS Patented Mar. 17, 1925.

1,530,028

UNITED STATES PATENT OFFICE.

PERCY LEON BILLINGSLEY, OF ORLANDO, FLORIDA.

PLANER.

Application filed July 5, 1921. Serial No. 482,381.

*To all whom it may concern:*

Be it known that I, PERCY L. BILLINGSLEY, a citizen of the United States, residing at Orlando, in the county of Orange and State of Florida, have invented certain new and useful Improvements in Planers; and I do hereby declare the following to be a full, clear, and exact description of the invention, such as will enable others skilled in the art to which it appertains to make and use the same.

The present invention relates to planers and kindred devices, and aims to provide a novel and improved portable device of that kind adapted to be driven by a flexible operating mechanism, and adapted especially for use as an attachment to the flexible operating mechanism disclosed in my copending application filed May 17, 1921, Serial No. 470,413 (Patent No. 1,424,148 granted August 1, 1922.)

Another object of the invention is the provision of such a device comprising novel means for mounting and guiding a circular or cylindrical planer bit or wheel, or equivalent rotary implement, for planing off the edges of doors, boards, and other objects, or for doing other similar work, provision being made for adjustments to regulate the depth and angle of the cut made.

A further object is the provision of such a device which is useful for planing the edges and other portions of doors, window sashes, boards, and the like, in order to supply the requirements for which ordinary hand planers are used, and the device having novel and improved features of construction to enhance the utility and efficiency thereof for the intended purposes.

A still further object is to provide a power-driven planer or device of that kind which can be conveniently manipulated manually for doing various kinds of planing with ease and dispatch, and the device including adjustments to regulate the cuts made and to comply with various conditions required.

With the foregoing and other objects in view, which will be understood as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:—

Figure 1 is a side elevation of the device, with the driving mechanism removed, and the rotary cutter shown in dot and dash line.

Fig. 2 is a plan view of the device.

Fig. 3 is an end view thereof.

Fig. 4 is a central cross section taken on the line 4—4 of Fig. 2, and showing the device assembled with the driving mechanism.

Fig. 5 is a section on the line 5—5 of Fig. 1.

The device comprises the stock or body having the ends 8 and 9, and a longitudinal outstanding base or sole flange 10 at one side to slide on the edge or surface of the board or other object worked on. The flange 10 extends from the end 8 to a point short of the intermediate portion of the slidable stock 7.

The stock 7 has a guide or slideway 27 perpendicular with the lower edge thereof intermediate the ends of said stock, and a depth slide or block 40 is slidable upwardly and downwardly in the guide or slot 27, and has a circular opening or bore 28 extending therethrough transversely of the stock 7 and guide 27. The slide 40 has a clamping plate 40' at one side held by a clamping screw 40'' to clamp said slide in its adjusted position. An upstanding screw stem 29 is secured to the upper portion of the slide 40 and passes slidably through the upper portion of the member or stock 7, and an adjusting nut 30 is threaded on said stem and bears on the stock 7. A lock nut 31 is threaded on the stem below the upper portion of the base 7 to be tightened for holding the stem 29 and slide 40 in adjusted position.

A handle 35 is secured on the stock 7 near one end thereof, for conveniently sliding the device lengthwise for the planing operation.

The planing cutter, or equivalent implement, is rotated by a driving or operating mechanism which is assembled with the slide 40. As shown in Fig. 4, the flexible operating mechanism, as disclosed in the aforesaid application, is used, and only the freely movable terminal portion of such mechanism is shown (the same reference characters being used as in such application). Such mechanism includes a terminal yoke 26 which has bushings 36 and 36' secured in the terminals thereof, and a tubular spindle or arbor 37 is fitted for rotation in said bushings. A pulley wheel 42 is secured on the spindle 37 between said bushings for retaining the spindle in place, and a belt 44 passes around said pulley wheel for rotating said spindle, and is guided between rollers 45. The mandrel or shaft 38 on which the planer cutter or implement 43 is secured, is received by the tubular spindle 37, and said spindle has a screw-threaded portion 37' at that end opposite to the cutter into which the screw-threaded terminal 38" of the shaft 38 is screwed, for fastening said shaft to the spindle. The shaft has a collar 38' thereon to bear against that end of the spindle opposite to the screw-threaded end, for fastening the shaft securely to the spindle, and the rotary cutter 43 is secured on the projecting portion of the shaft adjacent to the collar 38'. The bushing 36 is extended from the yoke 26 in order to enter the opening 28 of the slide or block 40, so as to provide a detachable slip connection between the driving mechanism and the portable or movable device. The extended portion of the bushing 36 is thus conveniently slipped in the opening 28, for assembling the mechanism and device, and in order to hold them assembled, said bushing has an annular groove 39 in the extended portion thereof to receive a ball or catch 41 slidable in the slide or block 40 and projected by a spring 41' confined behind said ball. When the slide 40 and bushing 36 are fitted together, the ball or catch 41 is pressed into the bore or socket, and when the parts are moved together, said ball will snap into the groove 39, thereby holding the yoke 26 and slide 40 together, but permitting said parts to turn relatively, when the device is moved longitudinally. The bushing 36 can thus turn in the slide 40. When the driving mechansim and device are thus assembled, the cutter can be attached by sliding the shaft 38 into the spindle 37 and screwing said shaft into place. The cutter is thus secured to the rotary spindle 37 of the driving mechanism, and such spindle and bit will be adjusted with the slide 40 upwardly and downwardly. The terminal portion or bushing 36 of the driving mechanism is thus conveniently assembled with the device for adjustment therewith, to position the cutter accordingly, and in a like manner other devices or attachments can be used interchangeably with the planer, by having such devices each equipped with a slide or block 40 to fit on the bushing 36. Various devices of attachments for doing different kinds of work can thus be used interchangeably with the driving mechanism.

A miter or angle gage is provided for regulating the angle of the cut made, and, for this purpose, a guide bar 55 extends longitudinally under the stock 7 and has upstanding ears 52 at its ends overlapping the ends 8 and 9 of the stock 7 and pivoted thereto by means of pivot screws 53 extending through the ears 52 and threaded into the ends of the stock. The bar 55 is thus pivoted for turning movement about a longitudinal axis, to enable said bar to be adjusted to different angles with respect to the base flange or shoe 10. In order to facilitate the adjustment of said bar or guide member 55 to different angles, pointers 46 are secured on the ends of the stock 7 and extend over the degree graduations 47 on the ears 52.

A depth slide or plate 56 is carried by the stock 7 and has a lower outstanding sole flange or shoe 57 extending longitudinally of the stock at one side thereof. Said slide 56 and its flange or shoe 57 are disposed at that end of the stock opposite to the flange or shoe 10, and the adjacent ends of said flanges or shoes 10 and 57 are spaced apart to accommodate the cutter between them, as seen in Fig. 1. The slide 56 has inclined grooves 58 engaging inclined guide ribs 59 with which the stock 7 is provided at one side, for guiding said slide for adjustment upwardly and downwardly on an incline, so that the end of the flange 57 under the cutter is kept out of contact therewith in raising and lowering said flange. An adjusting screw 60 is threaded through a lug 61 outstanding from the slide 56 above the flange 57, and said screw is seated in a slotted ear 62 projecting from the stock 7 between the ribs 59. The screw 60 has collars 63 above and below the ear 62, to prevent the screw from sliding through said ear, and the screw has a knob 64 at its upper end for conveniently turning said screw by hand to move the slide 56 upwardly or downwardly. The slide 56 and ribs 59 have slots 65 receiving clamping bolts 66 having wing nuts 67 thereon, whereby said bolts can be tightened to assist in clamping the slide 56 in its adjusted position.

In using the device, the slide or block 40 is assembled with the driving mechanism, by fitting the bushing 36 in said slide, and the ball 41 will snap into the groove 39, to hold the mechanism and device assembled. The cutter is then attached by inserting the shaft or stem 38 thereof into the tubular spindle 37 and screwing said shaft into place within the spindle. The slide or block 40 is then adjusted upwardly or downwardly to position the cutter 43 with the lower plane surface of the flange 10 tangential with the bottom of the cutter 43, and said slide 40 is then secured in place by the clamping screw 40" and lock nut 31. The slide or plate 56 is then adjusted to raise or lower the flange 57, by turning the knob 64, in order to bring the lower plane surface of the flange 57 the desired distance above the plane of the lower surface of the flange 10 parallel therewith, so as to regulate the depth of the cut made or the amount of material cut away by the cutter. The slide 56 is then secured in place by tightening the nuts 67.

If a square cut is desired, the guide bar 55 is positioned at right angles with the flanges 10 and 57, and if a miter or bevel cut is wanted, said bar 55 is positioned at the desired angle with respect to said flanges, the angle being indicated by the pointers 46 on the graduations 47. The planer is then used in much the same as an ordinary hand planer, the flanges or shoes 10 and 57 sliding on the edge of the board, door, window sash or other object to be planed off, and the guide bar 55 sliding along one side of the object. The device is moved or pushed forwardly by the handle 35, and the flange or shoe 57 moved in advance of the cutter 43, while the flange or shoe 10 follows in rear of such cutter. In other words, the flange 57 travels on the surface ahead of the cutter, which is slightly higher than the surface planed off by the cutter on which the flange or shoe 10 slides. The device can be moved with a minimum manual effort, inasmuch as the work of cutting or planing off the wood is done by the power-driven cutter. It is thus an easy matter to plane off the edges and other surfaces of doors, window sashes, boards and other similar objects, and the depth of the cut made can be readily adjusted by moving the slide 56 upwardly or downwardly to different positions, whereas either square or miter cuts can be made for producing a square or bevel edge or surface on the object. The device is intended especially for planing off the edges or corners of boards and other objects, and for rabbeting them in certain instances. The gage bar 55 can not only be swung below the flanges 10 and 57 and below the stock 7, but can also be swung to that side of the stock opposite to the flanges, with the bar 55 in substantially the same plane as the flanges. In the last named position of the gage bar 55, the device will have a broad lower surface, and the device may be supported in inverted position and used similar to a stationary planing machine.

Having thus described the invention, what is claimed as new is:—

1. A planer comprising a stock having an outstanding lower plane flange at one side flush with the bottom surface of the stock, a slide adjustably mounted on the stock at said side thereof for up and down movement and having a lower outstanding plane flange at said side of the stock to be disposed flush with or spaced above the bottom surface of the stock, said flanges being spaced apart, a depth slide adjustable vertically in the stock, and a rotary cutter at said side of the stock carried by said slide and located between said flanges.

2. A planer comprising a stock, flanges supported from the stock at the bottom surface thereof and projecting from the stock at one side thereof, said flanges being spaced apart, a cutter at said side of the stock between said flanges, and a gage bar having upwardly extending ears pivotally connected with said stock, said bar being arranged to be positioned under the stock and said flanges and to be positioned at that side of the stock opposite to the flanges substantially in the same plane as said flanges.

In testimony whereof I have signed my name to this specification in the presence of two subscribing witnesses.

PERCY L. BILLINGSLEY.

Witnesses:
H. M. VOORHIS,
ANNIE M. SADLER.